G. B. N. DOW.
ATTACHMENT FOR FAUCETS.
APPLICATION FILED AUG. 24, 1909.
950,529.
Patented Mar. 1, 1910.
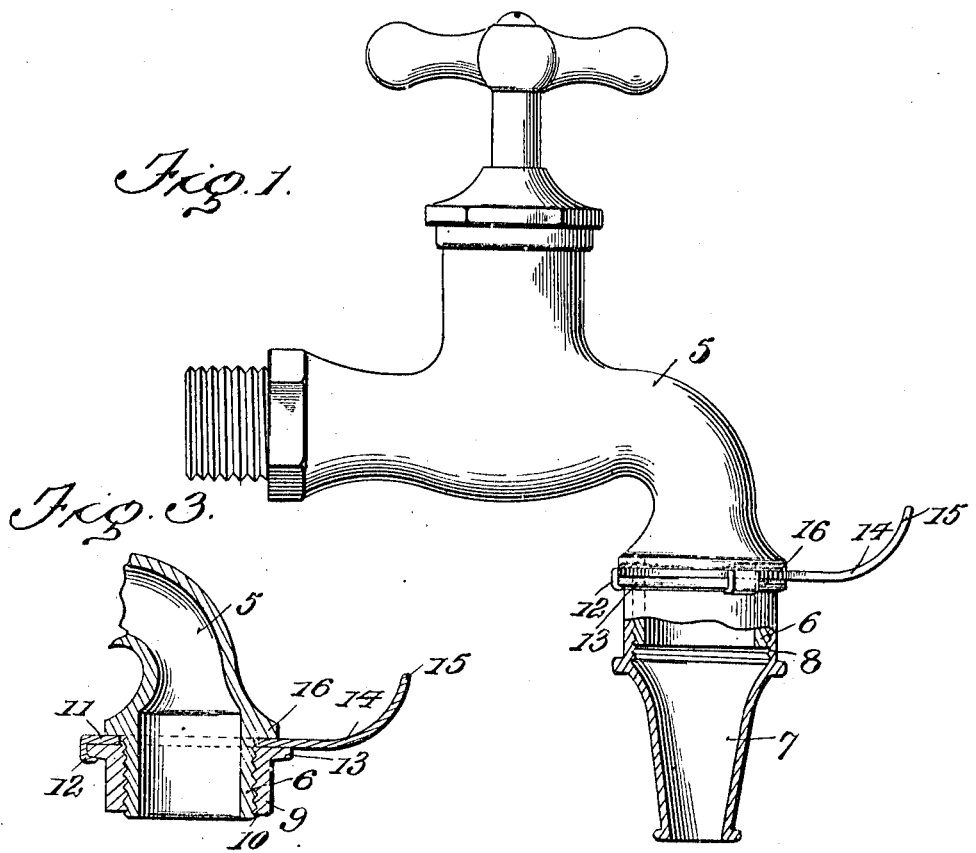
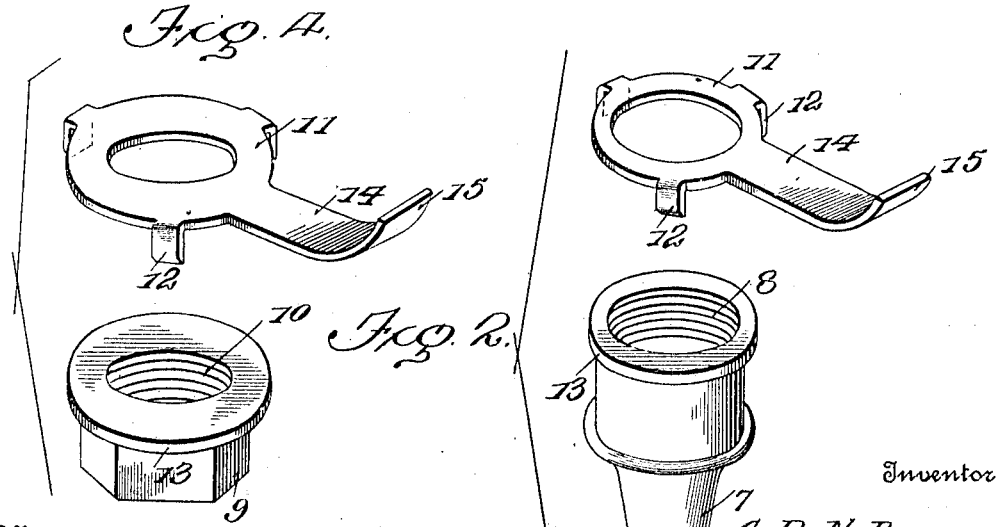
Witnesses
W. A. Williams
L. B. Baker
Inventor
G. B. N. Dow.
By Dudley Browne Phelps
Attorneys

UNITED STATES PATENT OFFICE.

GEORGE B. N. DOW, OF MANCHESTER, NEW HAMPSHIRE, ASSIGNOR OF ONE-HALF TO ALBERT W. COLE, OF MANCHESTER, NEW HAMPSHIRE.

ATTACHMENT FOR FAUCETS.

950,529.  Specification of Letters Patent.  Patented Mar. 1, 1910.

Application filed August 24, 1909. Serial No. 514,444.

*To all whom it may concern:*

Be it known that I, GEORGE B. N. DOW, a citizen of the United States, residing at Manchester, in the county of Hillsboro and State of New Hampshire, have invented certain new and useful Improvements in Attachments for Faucets, of which the following is a specification My invention relates to certain new and useful improvements in attachments for faucets designed to support a pail, kettle or other receptacle in position to receive water from the faucet, and has for its object the production of a device of this character which is cheap to construct, easy to attach to any ordinary faucet having a threaded end, and which will support a receptacle in position to be filled from the faucet.

With these and other ends in view my invention consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs Figure 1 is a perspective view of a faucet with one form of my attachment applied thereto, parts being shown in section to more clearly illustrate the construction. Fig. 2 is a perspective view of the two parts of my attachment in separated relation from each other; Fig. 3 is a section of the faucet with my attachment shown in a slightly different form; Fig. 4 is a perspective view of the two parts of the device illustrated in Fig. 3, separated from each other.

5 designates a faucet of any suitable or preferred construction, the construction of the faucet having nothing to do with my present invention except so far as the mode of attachment is concerned, and that the faucet is provided with a threaded end 6 which is ordinarily provided for the purpose of permitting a hose or the like to be attached thereto.

My attachment comprises a part adapted to be screwed onto the threaded end of the faucet and to carry the pail or other receptacle holder. The part which screws onto the faucet may be in the form of a nozzle 7 interiorly threaded at 8 to engage with the threads 6 on the faucet, as shown in Figs. 1 and 2, or it may be in the form of a nut 9 interiorly threaded at 10, as shown in Figs. 3 and 4.

The support comprises an attaching ring 11, the ring corresponding in shape and size to the upper end of the threaded attaching means, and provided on its periphery with the downwardly extending lugs 12 which are adapted to be bent around shoulders 13 formed on the upper end of the attaching device. The ring is provided on one side with the projecting arm or hook 14, having the upturned end 15 which forms the support for the receptacle to be filled from the faucet.

In faucets having screw threaded ends it is usual to provide a shoulder 16 at the base of the screw threaded portion and, consequently, when either the attaching means 7 or 9 with the support secured thereon in the manner described, is screwed onto the faucet the support will be clamped between the shoulder 16 on the faucet and the shoulder 13 on the attaching means.

From the above description it will be seen that my device is applicable to faucets of ordinary construction, is cheap to manufacture and can be placed on the faucet and removed therefrom without difficulty.

Having thus described my invention what I claim as new and desire to secure by Letters Patent is:

1. An attachment for faucets having a threaded end and a shoulder at the base of said threaded end, said attachment comprising an interiorly screw threaded part forming the faucet nozzle, a ring adapted to be clamped between the shoulder on the faucet and the screw threaded part, said ring being provided with a projecting hook adapted to form a support for pails or other receptacles to be filled from the faucet.

2. An attachment for faucets having a threaded end and a shoulder at the base of said threaded end, said attachment comprising an interiorly screw threaded part, a shoulder at the top of said screw threaded part, a ring provided with projections bent over the shoulder, said ring being adapted to be clamped between the shoulder on the faucet and the shoulder on the screw threaded part, said ring being provided with a projecting hook adapted to form a support for pails or other receptacles to be filled from the faucet.

In testimony whereof I affix my signature in presence of two witnesses.

GEORGE B. N. DOW.

Witnesses:
C. A. SULLOWAY,
JOHN O'NEILL.